(No Model.)  
2 Sheets—Sheet 1.

G. W. RANDOLPH.
COMBINED SIDE HARROW AND CULTIVATOR.

No. 509,767.  
Patented Nov. 28, 1893.

Witnesses:  
Wm C. Dashiell  
H. F. Beinhorn

George W. Randolph  
Inventor

By Edson Bros.  
Att'ys.

THE NATIONAL LITHOGRAPHING COMPANY,  
WASHINGTON, D. C.

(No Model.) 2 Sheets—Sheet 2.
G. W. RANDOLPH.
COMBINED SIDE HARROW AND CULTIVATOR.
No. 509,767. Patented Nov. 28, 1893.
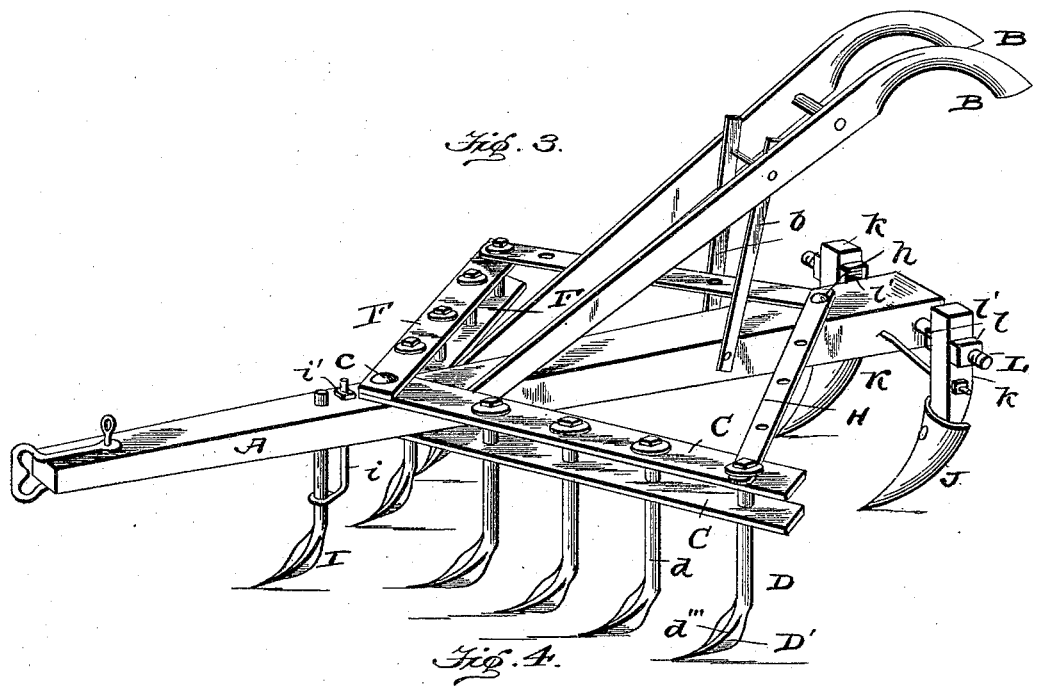
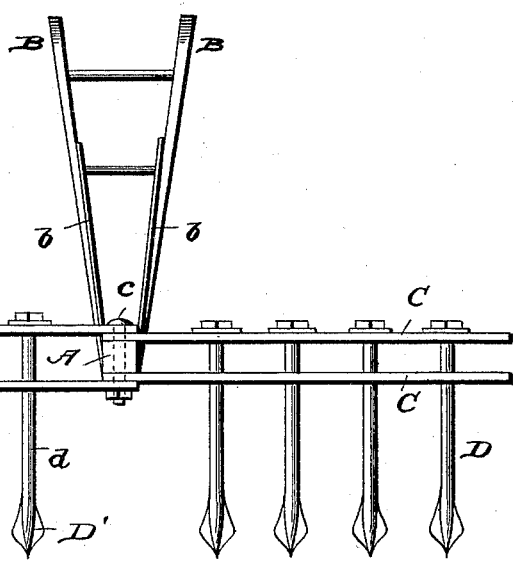

United States Patent Office.

GEORGE W. RANDOLPH, OF MEMPHIS, TENNESSEE, ASSIGNOR OF ONE-HALF TO JAMES M. SMITH, OF SAME PLACE.

COMBINED SIDE HARROW AND CULTIVATOR.

SPECIFICATION forming part of Letters Patent No. 509,767, dated November 28, 1893.

Application filed March 7, 1893. Serial No. 464,955. (No model.)

*To all whom it may concern:*

Be it known that I, GEORGE W. RANDOLPH, a citizen of the United States, residing at Memphis, in the county of Shelby and State of Tennessee, have invented certain new and useful Improvements in a Combined Side Harrow and Cultivator; and I do hereby declare the following to be a full, clear, and exact description of the invention, such as will enable others skilled in the art to which it appertains to make and use the same.

The present invention is a side harrow and cultivator in which I use a rank of harrow teeth of peculiar form adapted to penetrate the ground deeper and to better advantage than harrow teeth as heretofore constructed and thus enable the ground to be more thoroughly harrowed and prepared. The harrow tooth which I employ consists of a yielding shank of metal adapted to be secured or fixed in the lateral frame or bar attached to the draft beam of the implement and provided with a curved foot which has a central ridge or web and tapers down to a fine penetrating point, whereby the diagonal rank of teeth are brought into position to penetrate the surface of the ground quite deeply and without any material increase in draft.

I may employ a single side harrow with a diagonal or inclined bar which is attached and braced to the draft beam, combined with a single cultivator tooth carried by the rear end of the draft beam; or the cultivator tooth may be dispensed with, and two diagonal or inclined frames employed to make a double side harrow designed to straddle the row of plants, each frame being inclined reversely to the other and carrying a rank of teeth of the peculiar form described, combined with a single harrow tooth carried by the draft beam between the inner adjacent ends of the ranks of teeth and which single tooth is braced or stayed by connection with the draft beam, all as will be hereinafter more fully described and particularly pointed out in the claims.

The accompanying drawings illustrate different embodiments of my side harrow and cultivator, in which—

Figure 1:
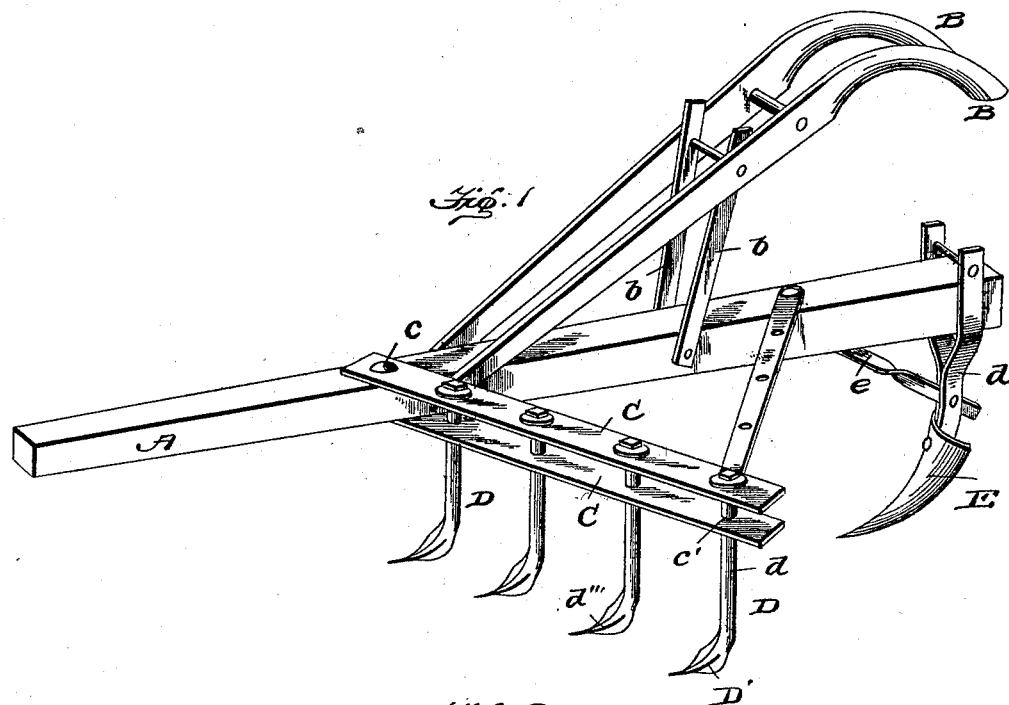
Figure 2:
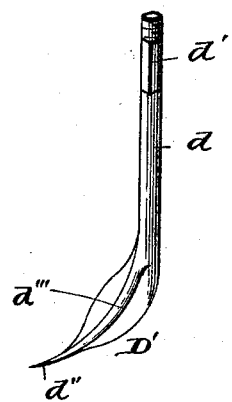

Figure 1 is a perspective view of the harrow and cultivator showing a single rank of diagonal teeth in front and to one side of the path of the single cultivator tooth on the rear end of the draft beam. Fig. 2 is a detached perspective view of the harrow tooth. Fig. 3 is a perspective view of the double harrow, with two cultivator teeth, and Fig. 4 is a rear elevation of the implement shown by Fig. 3.

Like letters of reference denote corresponding parts in the several figures of the drawings, referring to which—

A designates the longitudinal draft beam of the implement, and B, B, are the handles which are secured at their lower ends to the beam at an intermediate point of its length and braced by the vertical stays $b$, $b$, connected to the beam and the handles.

In the implement shown by Fig. 1, I employ a beam or parallel bars C, C, which extend to one side of the draft beam and a series or rank of teeth D, combined with a cultivator tooth or plow E which is carried by a stock $d$ connected to the rear end of the draft beam.

In the preferred construction of the laterally extending beam or bar C, C, I employ two parallel bars arranged one above the other and having their inner ends bearing against the upper and lower sides of the draft-beam, and connected thereto by means of the pivotal bolt $c$ which passes through the inner ends of the parallel bars and the draft beam, while the outer ends of the bars or transverse beam is fastened to the beam in rear of the handles and the other end connected to the parallel bars, as shown.

I preferably employ a rank or series of four teeth of the form shown by Fig. 2 of the drawings, that is to say, each tooth has a shank $d$, the upper end of which is made with a series of screwthreads to receive a nut, and below this threaded portion, the shank, is made square or polygonal in cross section as at $d'$ for a portion of its length, said squared or polygonal part of the shank being fitted in octagonal holes $c'$ in the parallel bars C, C, whereby the harrow teeth can be adjusted or turned axially in the parallel bars C, C, to bring the working faces of the teeth D at right angles to the line of draft of the implement, or to adjust said working faces at an angle to the line of draft, as will be readily understood. Each tooth has its lower end formed into the foot D' of the peculiar form shown by Fig. 2, the foot being integral with the shank or formed in one piece of metal therewith. This foot is curved or made concavo-convex in cross section, and it is also curved longitudinally and projected well forward beyond the vertical line of the shank. The foot is furthermore formed with converging side edges which meet so as to provide a thin narrow point $d''$; and running longitudinally of the foot, in the middle thereof, is a ridge or rib $d'''$ which extends from the point end $d''$ up to and merges into the shank.

As the bars C, C, are arranged at an angle to the line of the draft beam, the harrow teeth D, D, all lie to one side of the beam and are arranged one in rear of the other; and thus the teeth are adapted to effectually perform their work in harrowing the sides of the furrow; besides the peculiar form of the foot D' on each tooth enables the teeth to penetrate well into the ground; in fact, deeper than the ordinary harrow teeth.

The bars C, C, forming the support for the rank or series of teeth D can be adjusted at right angles to, or any angle between a right angle and the line of the draft beam, and to accommodate this adjustment, the brace is provided with a series of holes through any one of which the bolt can be passed that connects the brace to the draft beam. The cultivator or plow is carried by the stock $e$ of the ordinary form, which is braced by means of the brace $e'$ which is connected to the beam.

In Figs. 3 and 4 I have shown the implement adjusted for harrowing between the rows, or in other words, a double side harrow; but by removing the front tooth the implement can be made to straddle the row; also by using two plows in rear of the double rank or series of harrow teeth I may convert the implement into a double harrow and cultivator or plow. In this embodiment of the invention, two bars or beams, C, C, and F, F, are used one set of bars C, C, being arranged on one side of the draft beam while the other pair of bars F, F, are on the opposite side of the draft beam. Each of these bars C, C, and F, F, carry a rank or series of harrow teeth, D, of the form heretofore described and illustrated by Fig. 2; and the bars C, C, and their teeth are inclined backwardly from the beam in one direction while the other bars F, F, and their teeth D are inclined backwardly in the opposite direction from the draft beam. The bars C, C, are braced by the braces as in Fig. 1, and the other bars F, F, are braced by the bar H. The inner adjacent ends of the bars C, C, and F, F, are lapped upon each other over the beam and fastened thereto by the single bolt $c$; while the inner ends of the braces are likewise lapped on the beam and secured to the latter by the bolt $h$, as shown by Fig. 3. A harrow thus constructed with the two series of teeth D carried by the bars C, C, F, F, on opposite sides of the draft beam is adapted to straddle the row and so harrow or pulverize the soil on both sides of the row when drawn by the horses.

To adapt the implement to be used between the rows, I provide a harrow tooth I between the inner adjacent ends of the bar C, F, or between the inner teeth of the two series or ranks of teeth. This advance central tooth I is secured directly to the draft beam of the implement by passing its shank through an aperture in the beam in advance of the bolt $c$ that connects the bars C, F, to the beam; and the upper end of this tooth shank is threaded and provided with the fastening nut, said tooth I being further braced by means of the rod $i$ which has its lower end securely united to the shank of the tooth while the upper threaded end of the brace rod is passed through a hole in the beam and provided with the nut $i'$. It is evident that this central advance tooth I can be readily detached from the beam when it is desired to use the double side harrow to straddle the row; but to adapt the implement to be run between the rows this advance central tooth should be connected or fastened to the beam in the manner described. I have also provided the double side harrow with the cultivator teeth or plows J, K, which are adapted to be carried by the draft beam in rear of the double ranks of harrow teeth. A threaded rod L is passed horizontally through the rear end of the beam, and on this rod is fitted the upper perforated ends of the feet of stocks $k$, of the plows or cultivator teeth, each foot or stock being held in place by means of the nuts $l, l'$, which are fitted on the threaded rod on opposite sides of the stock and bear against the sides of the same. It is evident that the nuts can be loosened to enable either stock or foot to be moved laterally on the threaded rod, and thus the rear plows K, L, can be adjusted laterally of the draft beam.

I may use the double side harrow with the laterally spaced rear plows in order to straddle the row and to adapt the implement to harrow and plow the soil when it straddles the row; but it is not designed to use the rear plows when the front advance tooth I is employed for the purpose of running the implement between the rows; hence said rear plows should be detached from the threaded rod when the advance front tooth I is employed.

The operation and advantages of my improved harrow and cultivator will be readily understood and appreciated by those skilled in the art from the foregoing description.

I am aware that changes in the form and proportion of parts and details of construction of the mechanism herein shown and described as an embodiment of my invention can be made without departing from the spirit or sacrificing the advantages thereof, and I therefore reserve the right to make such alterations as fairly fall within the scope of the same.

Having thus fully described my invention, what I claim as new, and desire to secure by Letters Patent, is—

1. In a combined harrow and cultivator, the combination with a draft beam and the side bars C, F, connected to said beam and carrying the series of teeth, of the transverse bar L fixed to the beam in rear of the bars C, F, and their teeth, and the plows J, K, situated on opposite sides of the beam and having their stocks adjustably secured on the transverse bar L, substantially as and for the purposes described.

2. In a combined harrow and cultivator, the combination with the beam, and the side bars C, F, carrying the series of teeth, of the horizontal threaded rod L fixed to the beam near its rear end, the plows J, K, having their stocks fitted on the threaded rod L, and the nuts screwed on said threaded rod and bearing against the plow stocks, for the purpose described, substantially as set forth.

3. The combination with a beam, and the side bar adjustably connected thereto, of the series of teeth D each having its shank adjustably fastened in the side bar and provided at its lower end with a tapered foot D which is curved both longitudinally and in cross section and formed with a rib $d'''$ extending from the extremity of said foot up to the shank, substantially as described.

In testimony whereof I affix my signature in presence of two witnesses.

GEORGE W. RANDOLPH.

Witnesses:
H. T. BERNHARD,
W. CLARENCE DUVALL.